Dec. 29, 1931.　　　W. F. BIELICKE　　　1,839,011
LENS COMBINATION
Filed April 15, 1931
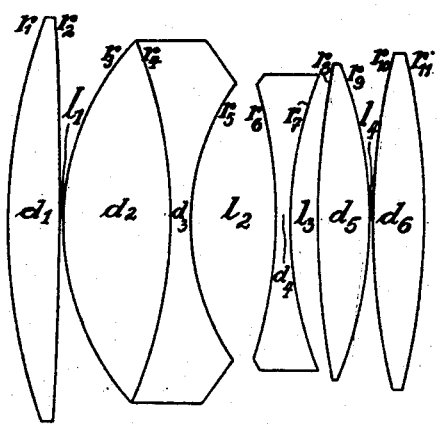
Inventor:
Willy F. Bielicke,
by
Attys.

Patented Dec. 29, 1931

1,839,011

UNITED STATES PATENT OFFICE

WILLY F. BIELICKE, OF BERLIN-HALENSEE, GERMANY

LENS COMBINATION

Application filed April 15, 1931, Serial No. 530,373, and in Germany April 28, 1930.

This invention relates to objective lens systems, such as are used for photographic, microscopic projection and similar purposes, the chief object of the invention being to provide a lens system corrected for spherical and chromatic aberration, astigmatism, distortion and coma and having a very large relative aperture.

United States Patent No. 1,540,752 of June 9th, 1925 describes an objective lens composed of three collective lenses enclosing a dispersive lens. One of the collective lenses is placed on that side of the dispersive lens which faces the incident light and the other two collective lenses are placed on the other side of the dispersive lens.

The object of the present invention is to increase the relative aperture of this lens. This is obtained by splitting the front element into two lenses which together have the form of a Gauss lens. The lens facing the incident light is a collective lens I, the other a dispersive meniscus lens II and III. The latter is composed of two lenses, a collective biconvex lens II and dispersive biconcave lens III.

The glass of the biconcave lens III has a higher refractive index and a larger colour dispersion than the biconvex lens II. The two lenses are cemented together and form a dispersive lens surface which is used to correct the residual aberrations caused by the other lens elements of the objective. The equivalent focal length of the combined lens II, III is made longer than the equivalent focal length of the combined objective and also of the single dispersive lens II. In the lens system shown on the accompanying drawing the combined focal length is $+100$ mm., that of the dispersive lens IV $-66.7$ mm. and that of the combined meniscus lens II and III $-1196$ mm. The long focal length of the combined meniscus lens does not materially effect the focal length of the combined objective, the cemented dispersive surface however is an excellent means for correcting the aberrations. After the light rays have passed the concave surface of the combined meniscus lens they are free from chromatic aberration, and the spherical aberration is overcorrected. The dispersive lens IV can be given a longer focal length than the dispersive lens of Patent No. 1,540,752. The radii of curvature being longer they reduce the spherical aberrations of the zones so that the combined objective can be made with higher relative aperture.

The data for making an objective lens according to the invention are shown in the drawing. The equivalent focal length is 100 mm., the relative aperture f: 1.3.

$r_1 + 116.5$   $d_1$ 9.3   $n_{1D}$1.6513   $n_{1G^1}$ 1.6732.
$r_2 -1200.0$   $l_1$ 0.4

$r_3 + 52.6$   $d_2$20.9   $n_{2D}$1.5891   $n_{2G^1}$ 1.6010.
$r_4 - 88.6$   $d_3$ 4.1   $n_{3D}$1.6477   $n_{3G^1}$ 1.6725.
$r_5 + 46.6$   $l_2$15.6

$r_6 - 88.6$   $d_4$ 3.1   $n_{4D}$1.6166   $n_{4G^1}$ 1.6383.
$r_7 + 77.5$   $l_3$ 5.2

$r_8 + 160.2$   $d_5$10.3   $n_{5D}$1.6223   $n_{5G^1}$ 1.6367.
$r_9 - 82.6$   $l_4$ 0.4

$r_{10}+ 136.2$   $d_6$10.3   $n_{6D}$1.6223   $n_{6G^1}$ 1.6367.
$r_{11}- 136.2$

The characters $r_1$ to $r_{11}$ inclusive indicate the radii of curvature of the lenses from left to right respectively. The light is presumed to be incident from left to right and all curvatures that are convex toward the incident light are positive and those that are concave are negative.

The characters $d$ with the subnumerals indicate the axial dimensions of the glass thicknesses and the characters 1 the air spaces.

The characters $N_D$ and $N_{G_1}$ respectively denote the refractive indices for the D line and for the $G^1$ line of the spectrum and the glasses of which the lenses I to VI are made.

Utilization of the principles of the present invention results in a lens system in which the spherical and chromatic aberrations, astigmatism, distortion and coma are corrected and having a very large relative aperture.

Claim:

In an objective lens for photographic, microscopic and similar purposes, the combination of five lenses, three of which are collective and enclose a dispersive meniscus and a dispersive biconcave lens, the dispersive meniscus having a longer focal length than the biconcave lens and being composed of a collective lens and a dispersive lens, the latter having a higher refractive index and a larger dispersion than the collective lens.

In testimony whereof I have signed my name to this specification.

WILLY F. BIELICKE.